Patented Apr. 23, 1940

2,197,931

UNITED STATES PATENT OFFICE 2,197,931

MAGNETIC TESTING MATERIAL

Frank C. Jacobs, Kensington, Pa.

No Drawing. Application November 6, 1936,
Serial No. 109,493

5 Claims. (Cl. 175—183)

My invention relates to magnetic testing, and consists in a paramagnetic powder for use in such testing.

The procedure in magnetic testing is well known. It consists first in inducing magnetic flux in the body to be tested, and then in distributing testing powder over the surface of the body. In known way the presence of surface racks, discontinuities, inhomogeneities, and other defects in the body causes distortion of the induced lines of magnetic flux, and the particles of the applied powder arrange themselves on the surface of the body in general conformity with the distorted lines of flux. Thus, the defects existing in the body and normally invisible to the naked eye are clearly revealed.

In general the efficiency of magnetic testing powder depends upon two factors: first, the physical or structural shape of the individual particles of the powder, and second, the magnetic properties of the particles.

The usual testing powder comprises finely divided electrolytic iron, in which the individual particles of the powder are of relatively flat shape, with irregular and relatively sharp edges. The magnetic characteristics of electrolytic or alpha iron are well known; for example, it is known that magnets made of such iron have low values of residual magnetism and coercive force. The value of the residual magnetism of a given paramagnetic material multiplied by the value of the coercive force of the material gives a product known as the magnetic energy-product, and, of course, such energy-product in electrolytic iron is relatively low. While the usual testing powder made of such iron has proved adequate in certain fields of testing, there are many cases in which it is far from satisfactory. For example, in the testing of turbine blades, I have found that such powder does not reveal all of the microscopic defects that develop in the blades in service.

As distinguished from the usual testing powder mentioned above, I provide a powder in which the individual particles are of rhomboidal or polyhedral shape, and I produce the powder from a magnetically hard metal—a metal in which the energy-product is relatively high. In the use of my powder, I have found that the particles are more sensitive and responsive to the lines of magnetic flux induced in the body being tested, with the consequence and effect that greater accuracy and more significant results are obtained. Indeed, on many occasions I have found flaws and defects in turbine blades that were approved in tests made with the usual powder.

Scientific investigators have for years been studying the magnetic properties of various steels and ferrous base alloys, and as a result of such investigation it has been discovered that steels and other ferrous base alloys including iron carbide, or including the carbides of the other metals with or without iron carbide, are magnetically hard, that is, they have high energy-products. By heating a steel or ferrous base alloy of this sort to a point above its upper critical temperature and then suddenly quenching it, the carbides are caused to precipitate, giving the metal a hard, crystalline grain structure, commonly known as a martensitic structure. Such metals as these are said to have precipitation-hardening qualities.

If a steel or ferrous base alloy is not heated up to or above its upper critical temperature before quenching, the precipitation of the included carbides is not complete, wherefore neither maximum structural hardness nor a perfect martensitic structure is obtained. The more closely such critical temperature is approached in the heating operation the greater is the precipitation of the carbides, and, accordingly, the greater is the structural hardness of the metal.

It will be understood that a steel, as herein considered, is a ferrous base metal including carbon in free or uncombined state, as distinguished from a ferrous base alloy including no uncombined carbon, and this distinction between steels and ferrous base alloys is to be kept in mind throughout the specification.

In all precipitation-hardening steels it appears that an increase in structural hardness is accompanied by an increase in magnetic coercive force, and that the magnetic energy-product is highest when the hardness of the metal is greatest, that is, when the structure of the metal is martensitic. In martensitic state the various high carbon steels show relatively low magnetic permeability and high coercive force.

In the case of ferrous base alloys of the binary group—alloys including iron and one alloying metal (tungsten, molybdenum, beryllium, and titanium being typical alloying metals)—I have observed greater coercive force and higher residual magnetism according as the upper critical temperature of the metal is more closely approached in the carbide-precipitating heat treatment. In some cases it appears that increase in coercive force occurs simultaneously with and in proportion to increase in structural hardness, while in other cases, notably in ferrous base alloys including titanium, this ratio does not hold—the magnetic properties of the metal do not change appreciably with slight increases in hardness, but only with relatively great increases in hardness, sometimes not until maximum hardness (martensitic structure) is approached or attained.

In the ternary group of carbon-free alloys of the iron, tungsten, and cobalt combination, the behavior is unlike the behavior of steels and binary iron alloys, in that the alloys of the ternary group do not attain both maximum structural hardness and maximum magnetic energy-product in a single carbide-precipitating heat treatment. The precipitation of the carbides produces structural hardness, but the coercive force does not increase with hardness. It appears that the coercive force is minimum when the hardness of the metal is maximum. In order to obtain a high coercive force in these ternary ferrous alloys, a second heat treatment must be conducted. Specifically, after the metal has been made martensitic, it is reheated to 1300° F. and slowly cooled. In consequence of this so-called secondary heat treatment, the coercive force of the hardened metal is increased and a high energy-product obtained.

I find that highest energy-product may be obtained in the ternary alloys of iron, nickel, and aluminum, or the quaternary alloys of iron, nickel, aluminum, and cobalt. And it appears that in all of the foregoing alloys the magnetic energy-product is highest when the structural hardness is maximum, with the exception of the ternary alloys of iron, tungsten, and cobalt.

Due to the great number of ferro-magnetic compositions falling under the precipitation-hardening classification, it is impossible for me in this specification to deal with each. I shall consider in exemplary way how I obtain a powder of the invention from an alloy containing 67% iron, 18% tungsten, and 15% cobalt.

Taking an alloy of the above analysis, preferably in the form of a sheet $\frac{1}{16}$ of an inch in thickness, I heat it to 2375° F., and then chill it to room temperature in a quenching bath. Such treatment effects precipitation of the carbides in the metal and the formation of a hard, crystalline grain structure (martensitic). The embrittled sheet is broken down in a hammer-mill, and the fragmented material coming from the hammer-mill is pulverized in a ball-mill. Alternately, I melt a quantity of the metal and spray it into a non-oxidizing bath of fish oil, thereby producing metal pellets or shot of martensitic grain structure. The pellets are first crushed between rolls and then pulverized in a ball-mill.

In following either of these procedures, I find that the particles of the powder produced are of the desired polyhedral shape, and exhibit high permeability and low coercive force, with a correspondingly low energy-product.

The next step consists in spreading the powder in a thin bed upon a pan, and introducing it to an oven, wherein it is heated to 1300° F. and then slowly cooled to room temperature. The powder thus processed exhibits high coercive force, high permeability, and a correspondingly high magnetic energy-product. It appears that the heat treatment of the powder develops a relatively great increase in coercive force, and only a relatively slight reduction in permeability.

While the powder is being heated in the manner described above, its color changes progressively from silvery gray to straw color, to orange, light purple, indigo, and various shades of blue, and, upon reaching 1300° F., its color becomes a deep purple. The deep purple color of the particles remains after the particles have been cooled and are ready for service, and, manifestly, such color particularly adapts the powder for use in testing bodies whose surfaces are of light color, or of bright metallic finish. In case dark purple is found to blend rather than to contrast with the surface color of the particular objects to be tested, I do not carry the heating of the powder up to 1300° F. The heating is interrupted when in the range of changing color the powder reaches a shade or hue which will distinctly contrast with the surface color of the objects to be tested. The color of the particles, when the heating is interrupted, remains after the powder has been cooled and is ready for service. In this manner testing powders of various colors and shades may be provided, and the usual practice of coloring testing powder by pigmentation is avoided, it being noted that the presence of pigment tends to lessen the desired mobility of the particles of the powder upon the surface of the object being tested.

Of course, the powder may be run through the usual grading and classifying screens either before or after heat treatment, it being understood that coarse powders are used to advantage in testing objects having rough surfaces, such as iron and steel castings, and that finer powders are used on objects having smoothly finished surfaces, such as the steel blades of turbines.

When the heating of the powder is interrupted at some point below 1300° F., the magnetic energy-product is not so high in value as it might be. However, by producing the powder of precipitation-hardening steels or other ferrous base metals, and by giving polyhedral shape to the individual particles, the efficiency of the powder is so high that it becomes feasible to depart from the ideal heat-treating temperature, in order to obtain desired coloration of the powder.

Recently, there has been developed a class of ferrous base alloys that far surpasses any known material for the construction of permanent magnets. These alloys contain practically no uncombined carbon and cannot be properly classified as steels. Such alloys possess precipitation-hardening qualities, and in the use of powders made from these alloys I have achieved perfection in magnetic testing.

More specifically, I have employed alloys containing nickel from 10 to 40%, aluminum from 5 to 20%, with small percentages of manganese, copper, and tungsten, sometimes with part of the nickel replaced by cobalt, and the remainder iron. In producing powders of these alloys the procedure is substantially identical with the procedure already described. That is, the metal is brought into martensitic condition, reduced to powder, and then subjected to heat treatment to obtain the desired coloration and modified magnetic properties. These alloys, as distinguished from the iron, tungsten, cobalt alloys, hereinbefore mentioned, exhibit high coercive force and low permeability in martensitic state, but these magnetic properties are modified and the desired energy-product is obtained by heat treating in the manner already described. In some cases I advantageously mix a true steel powder with a ferrous base alloy powder, or I mix two ferrous base alloy powders, to obtain in the product the desired combination of color and energy-product.

In still further refinement of my invention, I heat-treat the powder in the presence of coating material. Specifically, I cover a mass of the metallic powder with resin in fluid condition, and apply heat at from 400° to 800° F., until the mass forms a solid cake. If the required temperature of heat treatment in a particular powder be higher than 800° F., I raise the cake to such temperature and allow it to cool. Then I crush the cake, and again reduce the particles to powdered condition. Each particle will be found to be provided with a thin translucent coating which is insoluble in water. Such coatings protect the metal from oxidation, and serve to prevent spontaneous combustion of the powder, whereby the powder may be shipped and stored in plain cloth bags. Additionally, the powder may be used to better advantage in the well-known wet method of magnetic testing.

I claim as my invention:

1. A magnetic testing material comprising precipitation-hardening ferromagnetic metal in powdered form, such ferromagnetic powder being characterized by a modification in magnetic properties and color resultant from heat treatment, providing a testing powder in which the magnetic properties and color exist in highly effective relative degree, and the individual particles of the powder being protected by baked-on coatings.

2. A magnetic testing material comprising precipitation-hardening ferromagnetic metal in powdered form, the individual particles of the powder being of polyhedral form, and such ferromagnetic powder being characterized by a modification in magnetic properties and color resultant from heat treatment, providing in the powder an effective ratio between magnetic properties and color.

3. A magnetic testing powder including a mixture of two ferrous-base metals, both metals having precipitation-hardening qualities and one metal having, when in martensitic state, magnetic properties of different value than the other, and both metals being characterized by a modification in such magnetic properties resultant from heat treatment.

4. A magnetic testing material including a mixture of several powdered metals, at least one of said metals being a ferrous-base magnetic metal having precipitation-hardening qualities and being characterized by a modification in coercive force and color resultant from heat treatment.

5. A magnetic testing material including a mixture of several powdered metals, at least one of said metals being a ferrous-base magnetic metal having precipitation-hardening qualities and being characterized by a modification in coercive force and color resultant from heat treatment, the particles of the last-mentioned metal in said powdered testing material being provided with water-insoluble hard coatings.

FRANK C. JACOBS.